(12) United States Patent
Pagliani et al.

(10) Patent No.: US 10,503,249 B2
(45) Date of Patent: Dec. 10, 2019

(54) METHOD AND APPARATUS FOR CONSTRUCTION MACHINE VISUALIZATION

(71) Applicant: Topcon Positioning Systems, Inc., Livermore, CA (US)

(72) Inventors: Daniele Pagliani, Turin (IT); Nicola Finardi, Castel Maggiore (IT); Richard Jackson, Redland Bay (AU); Ivan Di Federico, Argenta (IT)

(73) Assignee: Topcon Positioning Systems, Inc., Livermore, CA (US)

( * ) Notice: Subject to any disclaimer, the term of this patent is extended or adjusted under 35 U.S.C. 154(b) by 10 days.

(21) Appl. No.: 14/789,493

(22) Filed: Jul. 1, 2015

(65) Prior Publication Data

US 2016/0004305 A1    Jan. 7, 2016

Related U.S. Application Data

(60) Provisional application No. 62/020,521, filed on Jul. 3, 2014.

(51) Int. Cl.

| | |
|---|---|
| *G06Q 10/06* | (2012.01) |
| *G06F 3/01* | (2006.01) |
| *H04N 9/31* | (2006.01) |
| *G06T 19/00* | (2011.01) |
| *G02B 27/01* | (2006.01) |
| *G06K 9/00* | (2006.01) |
| *G06Q 50/08* | (2012.01) |

(52) U.S. Cl.
CPC .......... *G06F 3/013* (2013.01); *G02B 27/017* (2013.01); *G06F 3/012* (2013.01); *G06K 9/0061* (2013.01); *G06Q 10/063114* (2013.01); *G06Q 50/08* (2013.01); *G06T 19/006* (2013.01); *H04N 9/31* (2013.01); *G02B 2027/0178* (2013.01)

(58) Field of Classification Search
None
See application file for complete search history.

(56) References Cited

U.S. PATENT DOCUMENTS

| 6,094,625 A * | 7/2000 | Ralston ................... G06F 3/011 239/161 |
| 2005/0256607 A1* | 11/2005 | Shepherd ................. E02F 9/26 700/213 |

(Continued)

OTHER PUBLICATIONS

International Search Report and Written Opinion dated Sep. 7, 2015, in connection with International Patent Application No. PCT/US15/38981, 10 pgs.

(Continued)

*Primary Examiner* — Xiao M Wu
*Assistant Examiner* — Steven Z Elbinger
(74) *Attorney, Agent, or Firm* — Chiesa Shahinian & Giantomasi PC (57) ABSTRACT

A system for displaying information to an operator of a machine comprises a head tracking system and a projection system. One system for displaying information uses a projection system and a see-through display to present two-dimensional images to an operator. One system uses a projection system and a see-through display to present three-dimensional images to an operator. One system uses a pair of smart glasses to display information to a user based a direction a user is looking.

15 Claims, 9 Drawing Sheets

(56) References Cited

U.S. PATENT DOCUMENTS

| | | | | |
|---|---|---|---|---|
| 2007/0050115 A1* | 3/2007 | Discenzo | ............... | B66C 13/063 |
| | | | | 701/50 |
| 2008/0269956 A1* | 10/2008 | Dix | ..................... | A01B 69/008 |
| | | | | 701/1 |
| 2010/0241471 A1* | 9/2010 | Nylander | ............ | G06F 17/5004 |
| | | | | 705/7.27 |
| 2013/0096873 A1* | 4/2013 | Rosengaus | ........... | G01C 15/002 |
| | | | | 702/151 |
| 2013/0155058 A1* | 6/2013 | Golparvar-Fard | .... | G06T 19/006 |
| | | | | 345/419 |
| 2013/0307771 A1* | 11/2013 | Parker | .................... | G06F 3/013 |
| | | | | 345/158 |
| 2013/0345857 A1* | 12/2013 | Lee | ........................... | G01S 5/16 |
| | | | | 700/229 |
| 2014/0184643 A1* | 7/2014 | Friend | .................... | G09G 3/003 |
| | | | | 345/633 |
| 2014/0248589 A1* | 9/2014 | Swiderski | .............. | G09B 9/042 |
| | | | | 434/69 |
| 2015/0199847 A1* | 7/2015 | Johnson | ................. | G09G 5/377 |
| | | | | 345/633 |

OTHER PUBLICATIONS

Office Action dated Aug. 29, 2018, in connection with European Patent Application No. EP 15 739 428.9-1216; 5 pgs.

* cited by examiner

METHOD AND APPARATUS FOR CONSTRUCTION MACHINE VISUALIZATION

This application claims the benefit of U.S. Provisional Application No. 62/020,521 filed Jul. 3, 2014, which is incorporated herein by reference in its entirety.

BACKGROUND

The present disclosure relates generally to the display of information, and more particularly to construction machine visualization.

Operators of construction machines are required to operate the machines according to a desired site plan in order to modify the site to match the desired site plan. The operator is required to continuously monitor the current state of the site and operate the machine in a manner to change the current site to the desired site plan. Typically, an operator of a construction machine must constantly reference a desired site plan, typically on paper or on a display in the cab of the machine, to ensure that the modification of the current site is performed to change the site to the desired state.

SUMMARY

In one embodiment, a method includes determining a direction of a user's gaze. The direction of the user's gaze can be determined using a head tracking system. The direction of the user's gaze can also be determined using a gaze tracking system. Information to be displayed to a user is then determined and the information is displayed to the user. The information can be displayed by transmitting the information to a projection system and/or a pair of smart glasses. In one embodiment, changes in the user's gaze and changes in the current state of a construction site are determined and new information is generated and displayed to the user.

DETAILED DESCRIPTION

Figure 1:
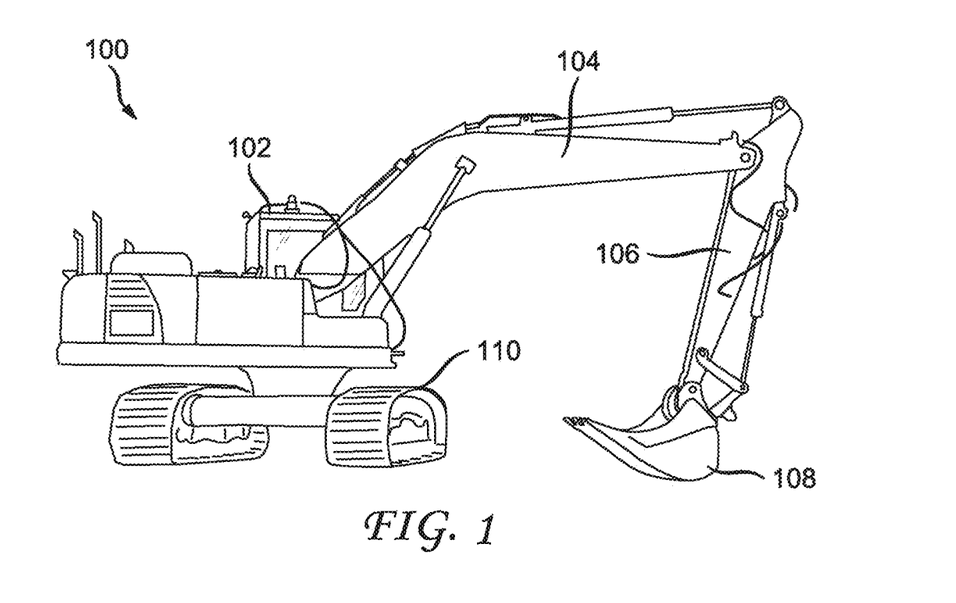
FIG. 1 depicts a construction machine, specifically, an excavator.

FIG. 1 depicts excavator 100 comprising cab 102, boom 104, stick 106, and bucket 108. Cab 102, boom 104, stick 106, and bucket 108 are rotatably mounted on an undercarriage 110. An operator sits in cab 102 and controls excavator 100 to move it to a desired location and manipulate various material, such as dirt. The accuracy and efficiency of operations facilitated by an operator vary depending on the experience of the operator. Accurate and efficient operation of excavator 100 typically requires an operator with extensive experience including interpreting site plans and modifying a site using a construction machine to achieve the desired site plan.

Figure 2:
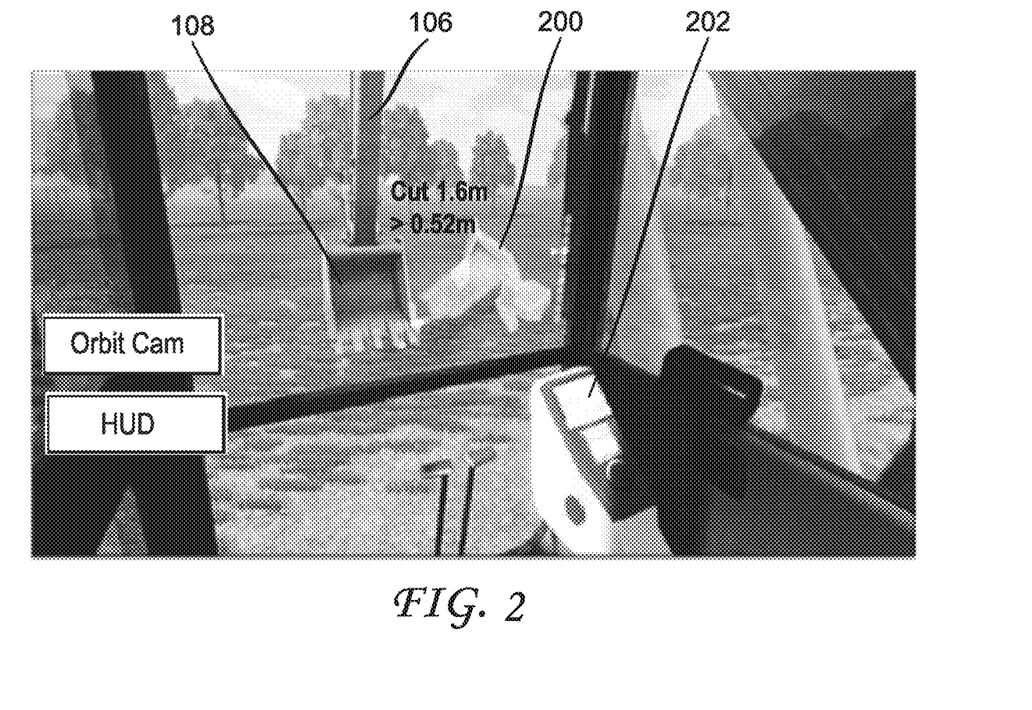
FIG. 2 depicts an operator's view from inside a cab of a construction machine according to an embodiment.

FIG. 2 depicts an operator's view from inside cab 102 of excavator 100 according to one embodiment of the invention. From inside cab 102, an operator can see stick 106 and bucket 108. In addition, according to one embodiment, the view from inside cab 102 includes information overlay 200 (also referred to as a heads up display or HUD) which, in this example, depicts an image of excavator 100 and a desired plan to modify the earth around excavator 100. As shown in FIG. 2, an operator can see the view of a site outside cab 102 as well as information overlay 200. An operator can select and/or change information displayed by information overlay 200 via intelligent display 202.

Figure 3:
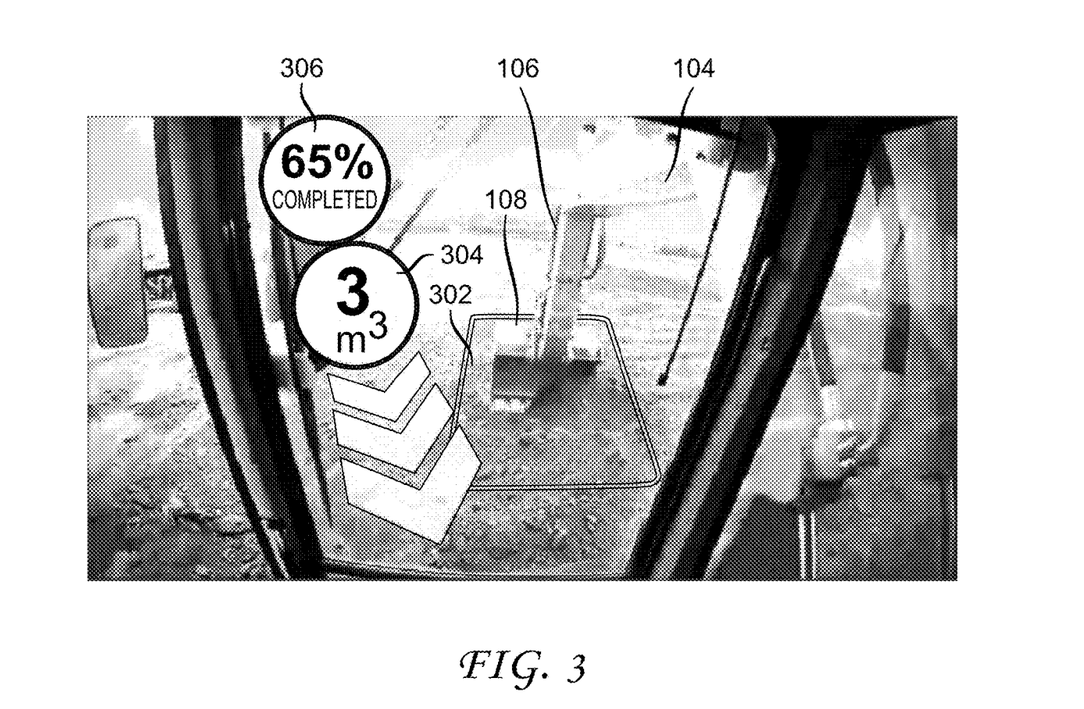
FIG. 3 depicts an operator's view from inside a cab of a construction machine according to an alternative embodiment.

FIG. 3 depicts an operator's view from inside cab 102 of excavator 100 according to one embodiment. Similar to FIG. 2, from inside cab 102, an operator can see boom 104, stick 106 and bucket 108. As operator is operating excavator 100, additional information is displayed including excavation area overlay 302 which depicts an area which is to be modified according to a predetermined desired site plan. Volume overlay 304 provides an operator with information concerning a volume of earth to be removed from excavation area 302. Completion overlay 306 provides an operator with an indication of the level of completion of an operation. In one embodiment, additional overlays are presented to the operator. For example, an overlay pertaining to a current position of bucket 108 compared to an expected position of bucket 108 can be displayed. In addition, information about excavator 100 engine rotations per minute (RPM), instantaneous fuel rate, fuel consumption, and other information received from excavator's electronic control unit (ECU) via various protocols can be displayed. In one embodiment, protocols can be control area network (CAN) bus protocols such as CAN J1939, CAN open, or CAN custom.

Figure 4:
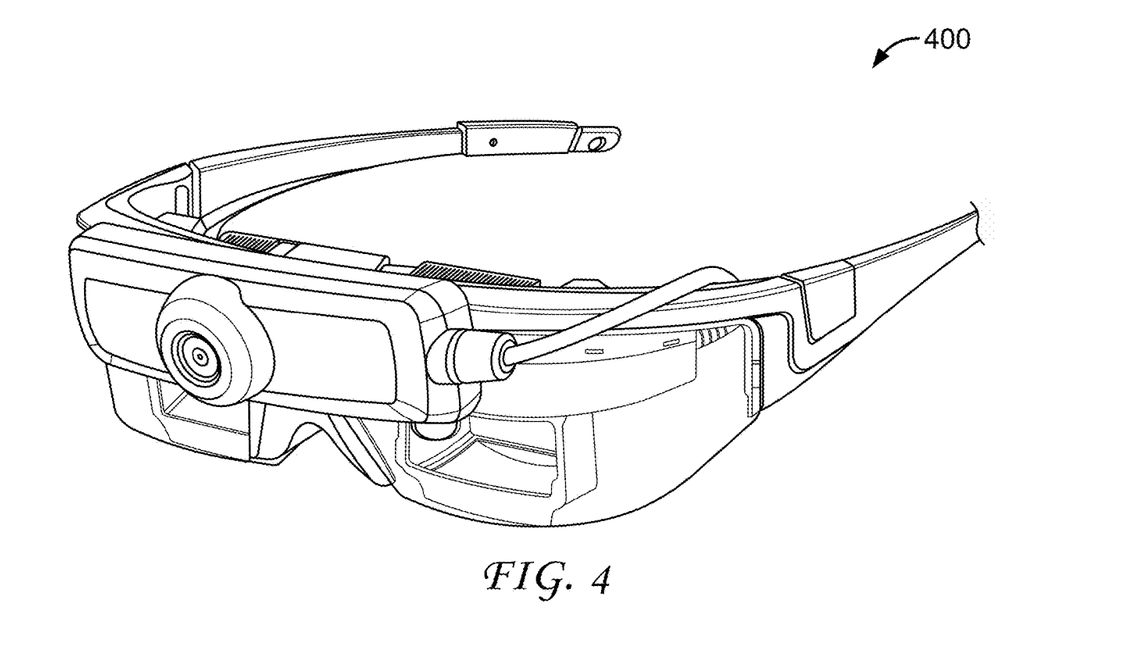
FIG. 4 depicts a pair of smart glasses according to an embodiment.

Information may be displayed to an operator using various hardware and methods. In one embodiment, information is displayed to an operator via a pair of smart glasses which incorporate display devices. FIG. 4 depicts smart glasses 400 including display devices which are used to provide a wearer with information by displaying information over the wearer's view through the smart glasses. Glasses 400 are used in one embodiment to provide information overlay 200 of FIG. 2 and excavation area overlay 302, volume overlay 304, and completion overlay 306 of FIG. 3. In another embodiment, a projection system is used to display information to an operator by projecting an image onto a transparent surface such as a windshield of a machine.

Figure 5:
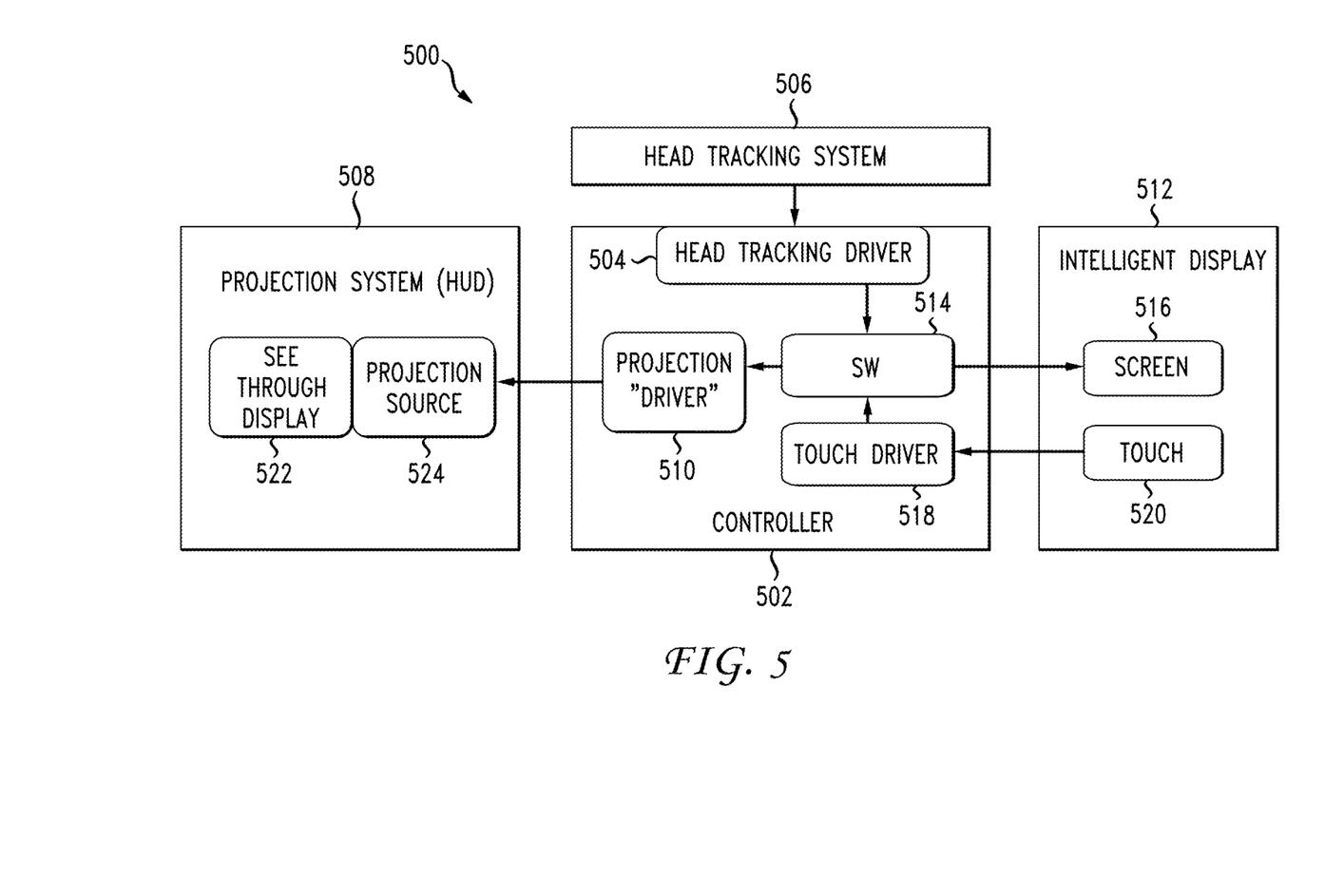
FIG. 5 depicts a system for displaying information to a user via a two-dimensional projection system according to an embodiment.

FIG. 5 depicts system 500 for advanced visualization of site information using overlays. Controller 502, located in a cab of a machine in one embodiment, manages the system and receives head tracking information via head tracking driver 504 from head tracking system 506 (also located in the cab of the machine in one embodiment). Controller 502 is also in communication with projection system 508 via projection driver 510. Projection system 508 comprises see-through display 522 and projection source 524. Controller 502 is also in communication with intelligent display 512. Specifically, software 514 of controller 502 is configured to allow controller 502 to communicate with screen 516 of intelligent display 512. Touch driver 518 of controller 502 is in communication with touch sensitive component 520 of intelligent display 512 and also with software 514. Intelligent display 512 can be used by an operator to select and/or change information displayed to a user via see-through display 522 and projection source 524. Each of these components are typically located in a cab of a machine but can be located or attached to other areas of the machine.

In one embodiment, controller 502 receives information from head tracking system 506 via head tracking driver 504 in order to determine where an operator is looking based on the operator's head position. Based on where the operator is looking, controller 502 determines what and where information should be presented to a user via an overlay (or HUD) using projection system 508. Information for display via projection system 508 can be selected and/or changed via intelligent display 512 using touch sensitive component 520.

In one embodiment, projection system 508 is a monoscopic system comprising a transparent surface and a light source. The transparent surface is used to visualize an image generated by the light source. The surface can cover or overlap a portion of a windshield or the entire windshield of a vehicle such as excavator 100 (shown in FIG. 1). The light source, in one embodiment, is capable of creating an appropriate light wave for the corresponding transparent surface in order to display information to the operator of excavator 100 (shown in FIG. 1). An image generated by the light source and transparent surface can be focused at a desired distance or at an infinite distance.

In one embodiment, head tracking system 506 is capable of evaluating a position of an operator within cab 102 (shown in FIG. 1). Head tracking system 506, in one embodiment, provides information about the current head position of the operator to controller 502 via head tracking driver 504. Images displayed to the operator are then varied based on information from head tracking system 506. For example, the content visualized on the display or location of the information on the display may change based on the operator's head movement and current position.

Controller 502, in one embodiment, stores and manages digital design information such as surfaces, line work, and other site data. Controller 502 manages machine geometry calculations such as excavation and navigation calculations. In one embodiment, controller 502 manages communications with a site communications system and other local machines (not shown). Controller 502, in one embodiment generates images for display via one or more display systems such as projection or smart glasses. Controller 502 can determine a current state of a site using information from various sensors attached to the machine such as image sensors, object sensors, etc. Information from these sensors is received by controller 502 which, in one embodiment, uses the information to generate a virtual representation of the current state of the site. This virtual representation can be used to determine differences between the current state of the site and a desired site plan.

Intelligent display 512, in one embodiment, is a high-brightness, multi-touch display device and is the primary device for user input and selection. In one embodiment, intelligent display 512 displays a two dimensional image of a machine in which intelligent display 512 is located and provides machine and site data to an operator. Intelligent display 512 can display a machine dashboard and provide information concerning the machine's current condition as well as provide machine diagnostics. Machine parameters can be received by controller 502 and transmitted to a device, such as intelligent display 512, for display to the user.

As described above, system 500 can be used to provide an operator with various information including site and machine operation via a heads-up display as well as machine conditions and diagnostics via intelligent display 512. System 500 displays two-dimensional information using a HUD via projection system 508. In other embodiments, the display of information to a user can be a three-dimensional or a display generated using smart glasses.

Figure 6:
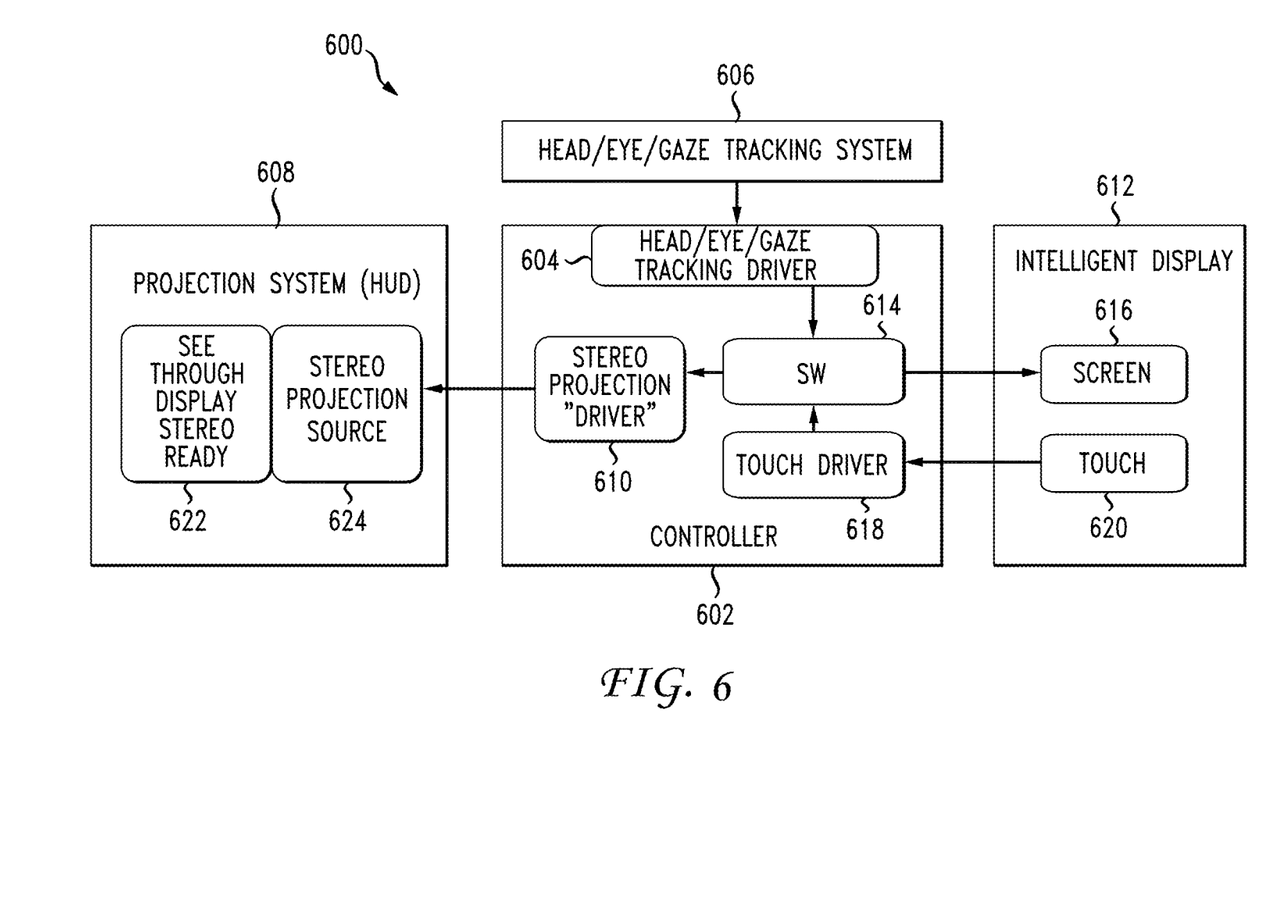
FIG. 6 depicts a system for displaying information to a user via a three-dimensional projection system according to an embodiment.

FIG. 6 depicts system 600 for displaying information via three-dimensional images. Controller 602 functions similar to controller 502 shown in FIG. 5 and includes head/eye/gaze tracking driver 604 for receiving information from head/eye/gaze tracking system 606. In order to generate three-dimensional images that are viewable by an operator, system 600 determines an operator's gaze by tracking the movement of the operator's eyes. The gaze and eye information, along with head position information, is used by system 600 to dynamically manage the parallax for the operator's eyes. Projection system 608 comprises stereo ready see-through display 622 onto which three dimensional images are projected by stereo projection source 624. Display information for projection system 608 is transmitted, in one embodiment, stereo projection driver 610 of controller 602 to stereo projection source 624 of projection system 608. Intelligent display 612 comprising screen 616 and touch sensitive component 620 operate in a manner similar to intelligent display 512 of FIG. 5.

Figure 7:
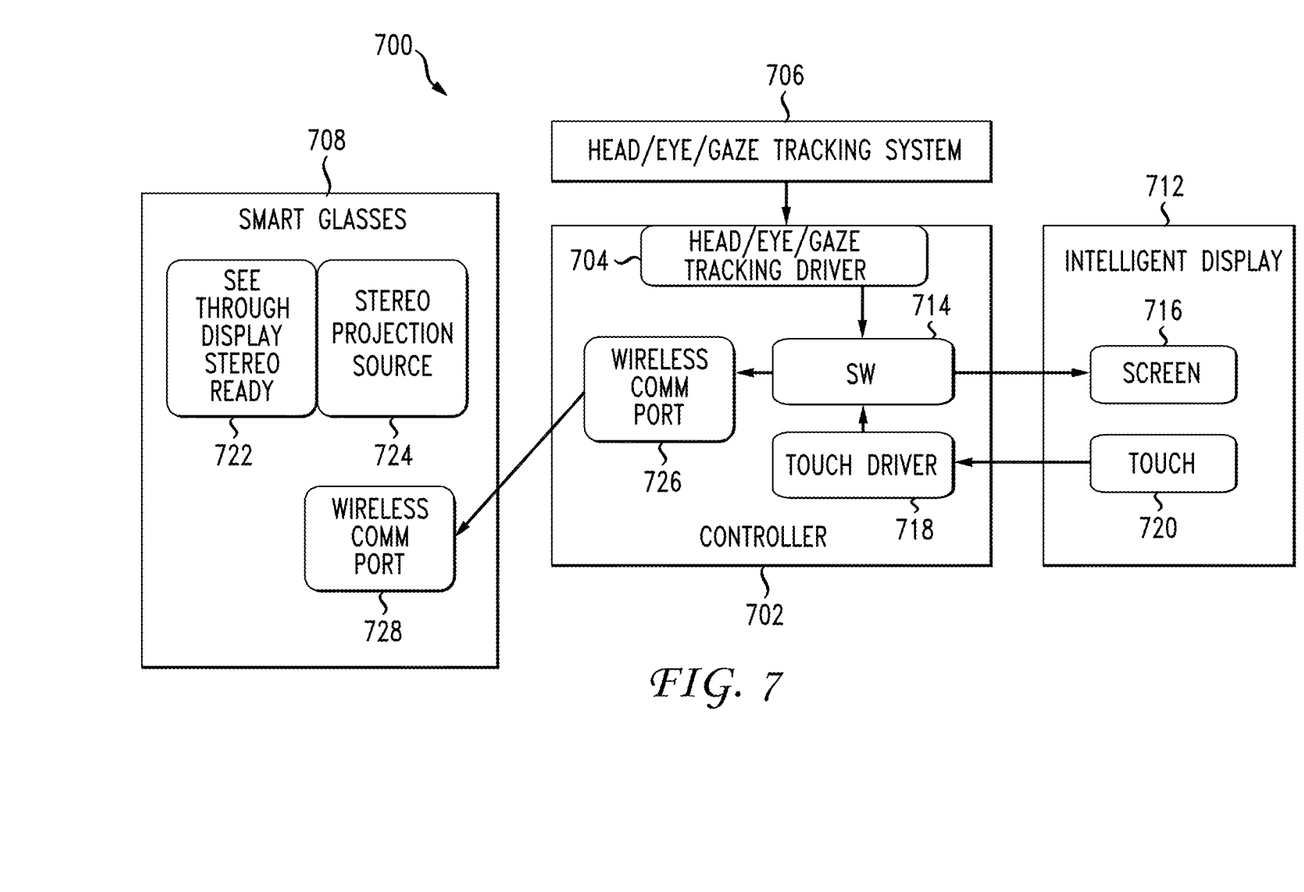
FIG. 7 depicts a system for displaying information to a user via a pair of smart glasses according to an embodiment.

In one embodiment, information is displayed to an operator via a pair of smart glasses such as smart glasses 400 shown in FIG. 4. FIG. 7 depicts a system in which information is displayed to an operator via a pair of smart glasses. Controller 702 functions similar to controller 502 shown in FIG. 5 and includes a head/eye/gaze tracking driver for receiving information from head/eye/gaze tracking system 706. In order to generate three-dimensional images that are viewable by an operator, system 700 determines an operator's gaze by tracking the movement of the operator's eyes. This gaze and eye information, along with head position information, is used by system 600 to dynamically manage the parallax for the operator's eyes. In addition, head, eye, and gaze tracking can be used to generate a 360 degree visualization of virtual information around the operator. In contrast with projection systems which project information onto a fixed transparent display (e.g. a windshield of a vehicle), system 700 allows information to be displayed to a user in any direction the user looks since the display of information is presented to the user via display devices incorporated in the associated pair of smart glasses 708. Smart glasses 708, in one embodiment, comprises stereo ready see-through display 722 onto which three dimensional images are projected by stereo projection source 724. Display information for projection system 708 is transmitted, in one embodiment, from wireless communication port 726 of controller 702 to stereo projection wireless communication port 728 of smart glasses 708. Information received via wireless communication port 728 is sent to stereo projection source 724 of projection system 708. Images are then displayed to the operator via smart glasses 708. Intelligent display 712 comprising screen 716 and touch sensitive component 720 operates in a manner similar to intelligent display 512 of FIG. 5.

Figure 8:
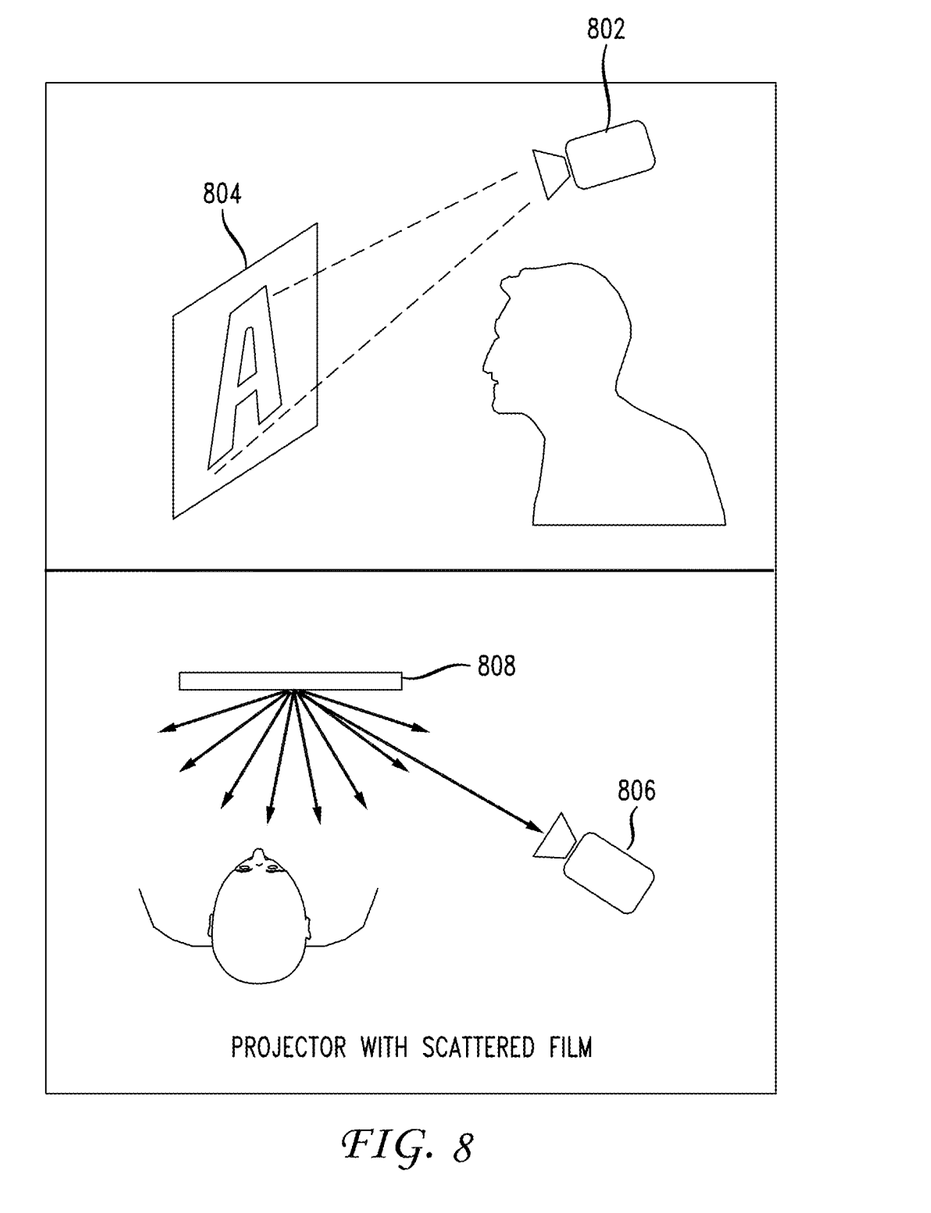
FIG. 8 depicts an example of a display according to an embodiment.

FIG. 8 depicts an example of a display according to one embodiment using projector 802 and display surface 804. Projector 802 projects an image onto display surface 804.

Similarly, projector 806 projects an image onto display surface 808. In various embodiments, different projectors and display surfaces are used. For example, a laser scan projector (scan line) can be used with a reflective film to scatter light emitted from the projector. A laser matrix projector can be used with a reflective film to scatter light emitted from the projector. A laser scan projector (full scan) can be used with reflective film to scatter light emitted from the projector. In one embodiment, a projector is used with a reflective film sized to be used as a display in conjunction with a window and/or view port of a cab of a machine. In one embodiment, a projector is used with a reflective film sized to be used with a pair of smart glasses. Smart glasses can be monocular (i.e., displaying information via one lens of the smart glasses), or binocular (i.e., displaying information via both lenses of the smart glasses). In one embodiment, a three dimensional image can be displayed to the user. In other embodiments, a mix of two dimensional and three dimensional images are displayed to the user.

Figure 9:
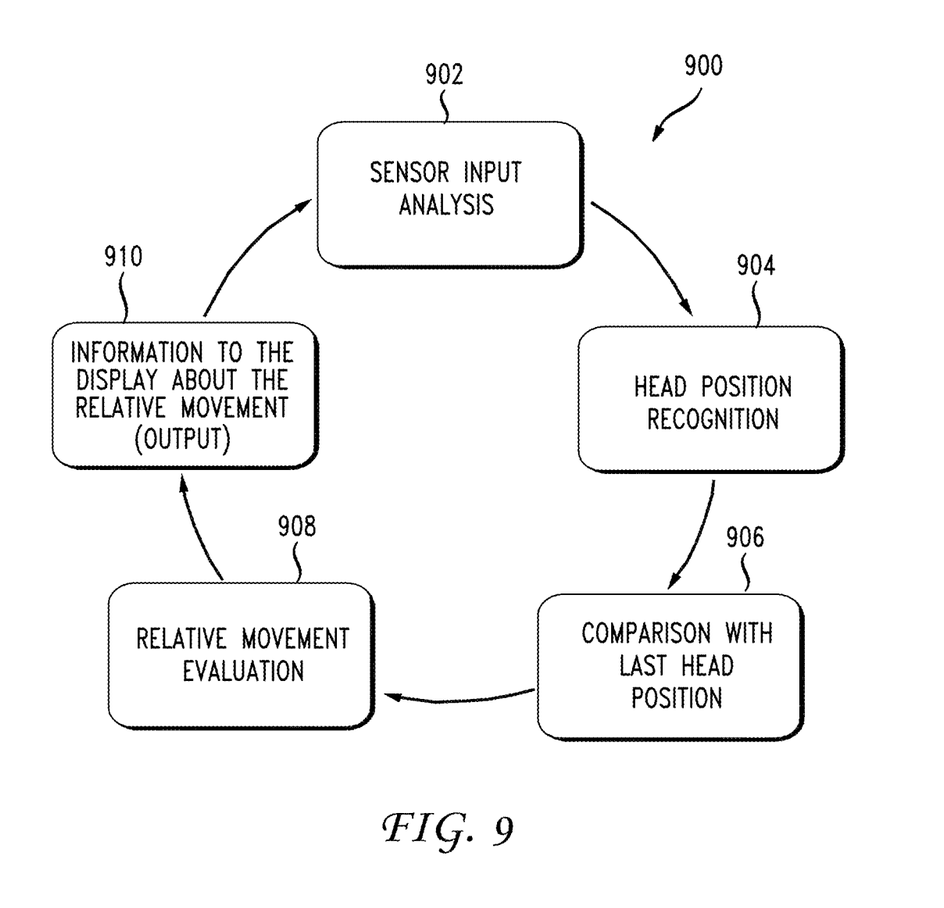
FIG. 9 depicts a flowchart of a method for displaying information according to an embodiment.

FIG. 9 depicts a flow chart of a method 900 for displaying information to a user according to one embodiment. Various configurations as described above can operate using the steps identified in method 900. At step 902, sensor input from various sensors (previously described) are received and analyzed. At step 904, a current head position of a user and/or operator is determined. At step 906 the current head position and a previous head position are compared. At step 908, relative head movement is determined in order to evaluate whether displayed information should be changed based on head movement. At step 910, information is transmitted to the display system based on possible change in head position as well as changes in conditions monitored (e.g., movement of the machine or parts of the machine, etc.)

Figure 10:
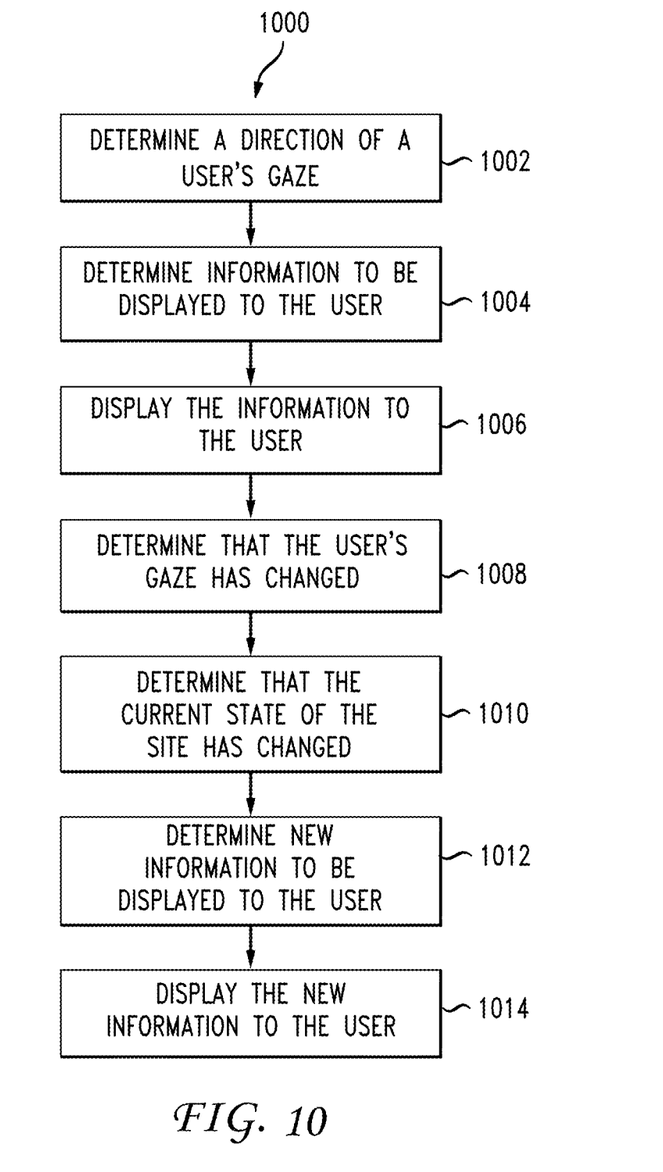
FIG. 10 depicts a flowchart of a method for displaying information according to an alternative embodiment.

FIG. 10 depicts a flow chart of a method 1000 for displaying information to a user of a machine according to an embodiment. At step 1002 a direction of a user's gaze is determined. In one embodiment, a user's gaze is determined based on a head position of the user. For example, controller 502 (shown in FIG. 5) receives information from head tracking system 506 via head tracking driver 504 in order to determine where a user is looking based on the user's head position. In one embodiment, a user's gaze is determined based on a position of the user's eyes and a direction the user's eyes are looking. For example, controller 602 (shown in FIG. 6) receives information concerning a user's gaze from head/eye/gaze tracking system 606 via head/eye/gaze tracking driver 604.

At step 1004, information to be displayed to the user is determined based on the direction of the user's gaze and a current state of a site. For example, the information to be displayed to the user can include how a portion of a site the user is looking at needs to be modified. In one embodiment, the information to be displayed to the user is determined by determining a difference between the current state of the site and a desired site plan. An operation to be performed based on the different between the current state of the site and the desired site plan can also be determined. The information displayed to the user can include the operation to be performed. In one embodiment, the difference between the current state of the site and the desired site plan is used to generate a value pertaining to a percent of completion of the site. The value pertaining to the percent of completion of the site can be displayed to the user.

At step 1006, the information is displayed to the user. In one embodiment, the information is displayed by transmitting the information from controller 502 (or 602) to a projection system, such as projection system 508. In one embodiment, the information is displayed by transmitting the information from controller 502 (or 602) to a pair of smart glasses, such as smart glasses 400 (shown in FIG. 4).

At step 1008, it is determined that a user's gaze has changed. A change in the user's gaze, in one embodiment, is determined using information from head/eye/gaze tracking system 606. In another embodiment, a change in the user's gaze is determined using information from head tracking system 506.

At step 1010, it is determined that the current state of the site has changed. In one embodiment, controller 502 (or 602) determines that the current state of the site has changed using input received from various sensors associated with and/or attached to a machine the user is operating.

At step 1012, new information to be displayed to the user is determined. This new information can be based on a change in the user's gaze and/or a change in the current state of the site. At step 1014, the new information is displayed to the user.

Figure 11:
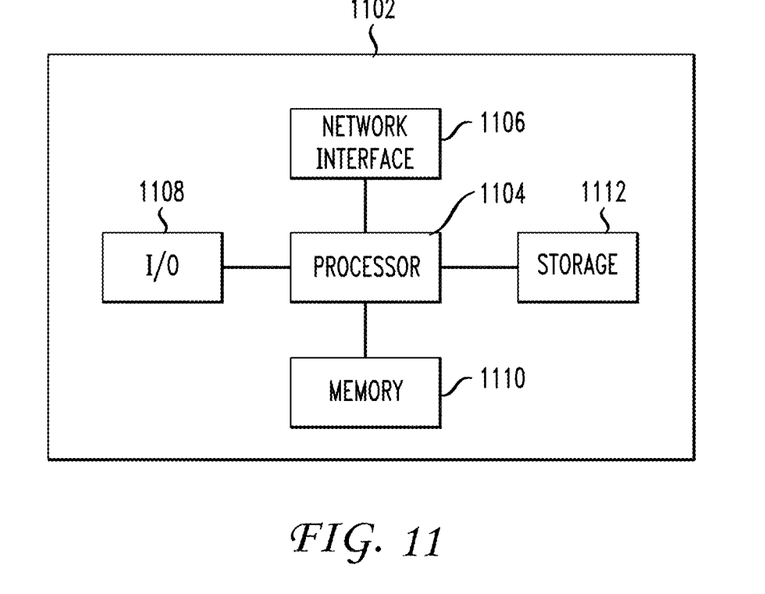
FIG. 11 depicts a high-level schematic of a computer according to an embodiment.

Smart glasses 400, 708, intelligent display 202 and the various components of systems 500, 600, and 700 can each be implemented using a computer. A high-level block diagram of such a computer is illustrated in FIG. 11. Computer 1102 contains a processor 1104 which controls the overall operation of the computer 1102 by executing computer program instructions which define such operation. The computer program instructions may be stored in a storage device 1112, or other computer readable medium (e.g., magnetic disk, CD ROM, etc.), and loaded into memory 1110 when execution of the computer program instructions is desired. Thus, the method steps of FIGS. 9 and 10 can be defined by the computer program instructions stored in the memory 1110 and/or storage 1112 and controlled by the processor 1104 executing the computer program instructions. For example, the computer program instructions can be implemented as computer executable code programmed by one skilled in the art to perform an algorithm defined by the method steps of FIGS. 9 and 10. Accordingly, by executing the computer program instructions, the processor 1104 executes an algorithm defined by the method steps of FIGS. 9 and 10. The computer 1102 also includes one or more network interfaces 1106 for communicating with other devices via a network. The computer 1102 also includes input/output devices 1108 that enable user interaction with the computer 1102 (e.g., display, keyboard, mouse, speakers, buttons, etc.) One skilled in the art will recognize that an implementation of an actual computer could contain other components as well, and that FIG. 11 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

The invention claimed is:

1. A method comprising:
   determining a head position of a user with respect to a windshield of a construction machine;

determining a direction of a gaze of the user based on the head position of the user with respect to the windshield;

generating a representation of a construction site based on data received at a first time from sensors located on a construction machine;

determining a difference between the representation of the construction site and a desired site plan;

determining an operation to be performed based on the difference, the operation comprising movement of an implement of the construction machine based on a current position of the implement and a desired position of the implement;

determining an image to be displayed to the user based on the head position of the user with respect to the windshield, the direction of the gaze of the user, the representation of the construction site, the desired site plan, and the operation to be performed, the image comprising an excavation area overlay, a volume overlay, and a completion overlay;

displaying the image to the user;

determining that the construction site has changed;

updating the representation of the construction site in response to the determining that the construction site has changed, the updating based on data received at a second time from the sensors located on the construction machine to generate an updated representation;

determining an updated image to be displayed to the user based on the direction of the user's gaze, the updated representation of the construction site, the desired site plan, and an additional operation to be performed based on a difference between the updated representation and the desired site plan; and displaying the updated image to the user.

2. The method of claim 1, wherein the direction of the gaze of the user is determined further based on a position of the user's eyes and a direction the user's eyes are looking.

3. The method of claim 1, the determining the image to be displayed to the user comprising:

determining a difference between the representation of the construction site and a desired site plan; and generating a value pertaining to a percent of completion of the construction site based on the determining the difference between the representation of the construction site and the desired site plan, wherein the image comprises the percent of completion of the construction site.

4. The method of claim 1, further comprising:

determining that the direction of the gaze of the user has changed;

determining a new image to be displayed to the user based on the determining that the direction of the gaze of the user has changed; and displaying the new image to the user.

5. The method of claim 1, wherein the displaying the image to the user comprises:

transmitting the image to be displayed to the user to a projection system.

6. The method of claim 1, wherein the image displayed to the user comprises an overlay pertaining to the current position of the implement and the desired position of the implement.

7. An apparatus comprising:

a processor; and a memory to store computer program instructions, the computer program instructions when executed on the processor, cause the processor to perform operations comprising:

determining a head position of a user with respect to a windshield of a construction machine;

determining a direction of a gaze of the user based on the head position of the user with respect to the windshield;

generating a representation of a construction site based on data received at a first time from sensors located on a construction machine;

determining a difference between the representation of the construction site and a desired site plan;

determining an operation to be performed based on the difference, the operation comprising movement of an implement of the construction machine based on a current position of the implement and a desired position of the implement;

determining an image to be displayed to the user based on the head position of the user with respect to the windshield, the direction of the gaze of the user, the representation of the construction site, the desired site plan, and the operation to be performed, the image comprising an excavation area overlay, a volume overlay, and a completion overlay;

displaying the image to the user;

determining that the construction site has changed;

updating the representation of the construction site in response to the determining that the construction site has changed, the updating based on data received at a second time from the sensors located on the construction machine to generate an updated representation;

determining an updated image to be displayed to the user based on the direction of the user's gaze, the updated representation of the construction site, the desired site plan, and an additional operation to be performed based on a difference between the updated representation and the desired site plan; and displaying the updated image to the user.

8. The apparatus of claim 7, wherein the direction of the gaze of the user is determined further based on a position of the user's eyes and a direction the user's eyes are looking.

9. The apparatus of claim 7, the determining the image to be displayed to the user comprising:

determining a difference between the representation of the construction site and a desired site plan; and generating a value pertaining to a percent of completion of the construction site based on the determining the difference between the representation of the construction site and the desired site plan, wherein the image comprises the percent of completion of the construction site.

10. The apparatus of claim 7, the operations further comprising:

determining that the direction of the a gaze of the user has changed;

determining a new image to be displayed to the user based on the determining that the direction of the gaze of the user has changed; and displaying the new image to the user.

11. The apparatus of claim 7, wherein the image displayed to the user comprises an overlay pertaining to the current position of the implement and the desired position of the implement.

12. A non-transitory computer readable medium storing computer program instructions, which, when executed on a processor, cause the processor to perform operations comprising:

determining a head position of a user with respect to a windshield of a construction machine;

determining a direction of a gaze of the user based on the head position of the user with respect to the windshield;

generating a representation of a construction site based on data received at a first time from sensors located on a construction machine;

determining a difference between the representation of the construction site and a desired site plan;

determining an operation to be performed based on the difference, the operation comprising movement of an implement of the construction machine based on a current position of the implement and a desired position of the implement;

determining an image to be displayed to the user based on the head position of the user with respect to the windshield, the direction of the gaze of the user, the representation of the construction site, the desired site plan, and the operation to be performed, the image comprising an excavation area overlay, a volume overlay, and a completion overlay;

displaying the image to the user;

determining that the construction site has changed;

updating the representation of the construction site in response to the determining that the construction site has changed, the updating based on data received at a second time from the sensors located on the construction machine to generate an updated representation;

determining an updated image to be displayed to the user based on the direction of the user's gaze, the updated representation of the construction site, the desired site plan, and an additional operation to be performed based on a difference between the updated representation and the desired site plan; and displaying the updated image to the user.

13. The non-transitory computer readable medium of claim 12, wherein the direction of the gaze of the user is determined further based on a position of the user's eyes and a direction the user's eyes are looking.

14. The non-transitory computer readable medium of claim 12, the determining the image to be displayed to the user comprising:

determining a difference between the representation of the construction site and a desired site plan; and generating a value pertaining to a percent of completion of the construction site based on the determining the difference between the representation of the construction site and the desired site plan, wherein the image comprises the percent of completion of the construction site.

15. The non-transitory computer readable medium of claim 12, wherein the image displayed to the user comprises an overlay pertaining to the current position of the implement and the desired position of the implement.

* * * * *